US006653589B2

(12) United States Patent
Dolton et al.

(10) Patent No.: US 6,653,589 B2
(45) Date of Patent: Nov. 25, 2003

(54) APPARATUS FOR WELDING

(76) Inventors: Peter Frank Dolton, 16 Fallon Dr., Dural NSW 2158 (AU); Park Johnstead, 1/20 Shearson Cresent, Mentone VIC 3194 (AU)

( * ) Notice: Subject to any disclaimer, the term of this patent is extended or adjusted under 35 U.S.C. 154(b) by 0 days.

(21) Appl. No.: 09/928,023

(22) Filed: Aug. 10, 2001

(65) Prior Publication Data

US 2002/0017505 A1 Feb. 14, 2002

(30) Foreign Application Priority Data

Aug. 10, 2000 (AU) .............................................. PQ9331

(51) Int. Cl.[7] .................................................. B23K 9/04
(52) U.S. Cl. ............................ 219/76.14; 219/125.11
(58) Field of Search ........................ 219/76.14, 125.11; 228/29, 45

(56) References Cited

U.S. PATENT DOCUMENTS

| 4,514,443 A | * | 4/1985 | Kostecki ..................... 427/230 |
| 4,550,235 A | * | 10/1985 | Fuwesi ..................... 219/76.14 |
| 4,647,749 A | * | 3/1987 | Koshy ..................... 219/76.14 |
| 4,687,899 A | * | 8/1987 | Acheson ..................... 219/76.14 |
| 4,873,419 A | * | 10/1989 | Acheson ..................... 219/125.1 |
| 5,539,177 A | * | 7/1996 | Okuya et al. ..................... 219/61 |
| 6,073,322 A | * | 6/2000 | Russo ..................... 29/26 A |
| 6,137,076 A | * | 10/2000 | Esslinger et al. ..................... 219/76.14 |
| 6,284,995 B1 | * | 9/2001 | Esslinger et al. ..................... 219/76.14 |
| 6,295,707 B1 | * | 10/2001 | Siracusa ..................... 29/26 A |
| 6,448,531 B1 | * | 9/2002 | Esslinger et al. ..................... 219/76.14 |

* cited by examiner

Primary Examiner—M. Alexandra Elve
Assistant Examiner—Kevin P. Kerns
(74) Attorney, Agent, or Firm—Andrus, Sceales, Starke & Sawall, LLP

(57) ABSTRACT

An apparatus (10) for welding a bore of a work piece (24) includes a torch tube (18) carrying a welding torch (20). The torch tube is removably connected to a housing (12) which houses a rotating drive motor (14) for rotating the torch tube (18). A feed screw (34) extends from the housing. The axial position of the feed screw (34) is controlled by an axial positioning motor (16). In use, align bore bearings (26,28) are mounted to the work piece (24). Torch tube (18) is then positioned within the align bore bearings (26,28). The torch tube is then fixed in the housing. Feed screw (34) is adjusted until its free end contacts the work piece (24). Welding commences when drive motor (14) starts rotating the torch tube (18). In order to deposit a bead of weld metal in the bore, the feed screw (34) is moved to adjust the axial position of the torch tube (18) and housing (12) relative to the work piece (24).

14 Claims, 8 Drawing Sheets

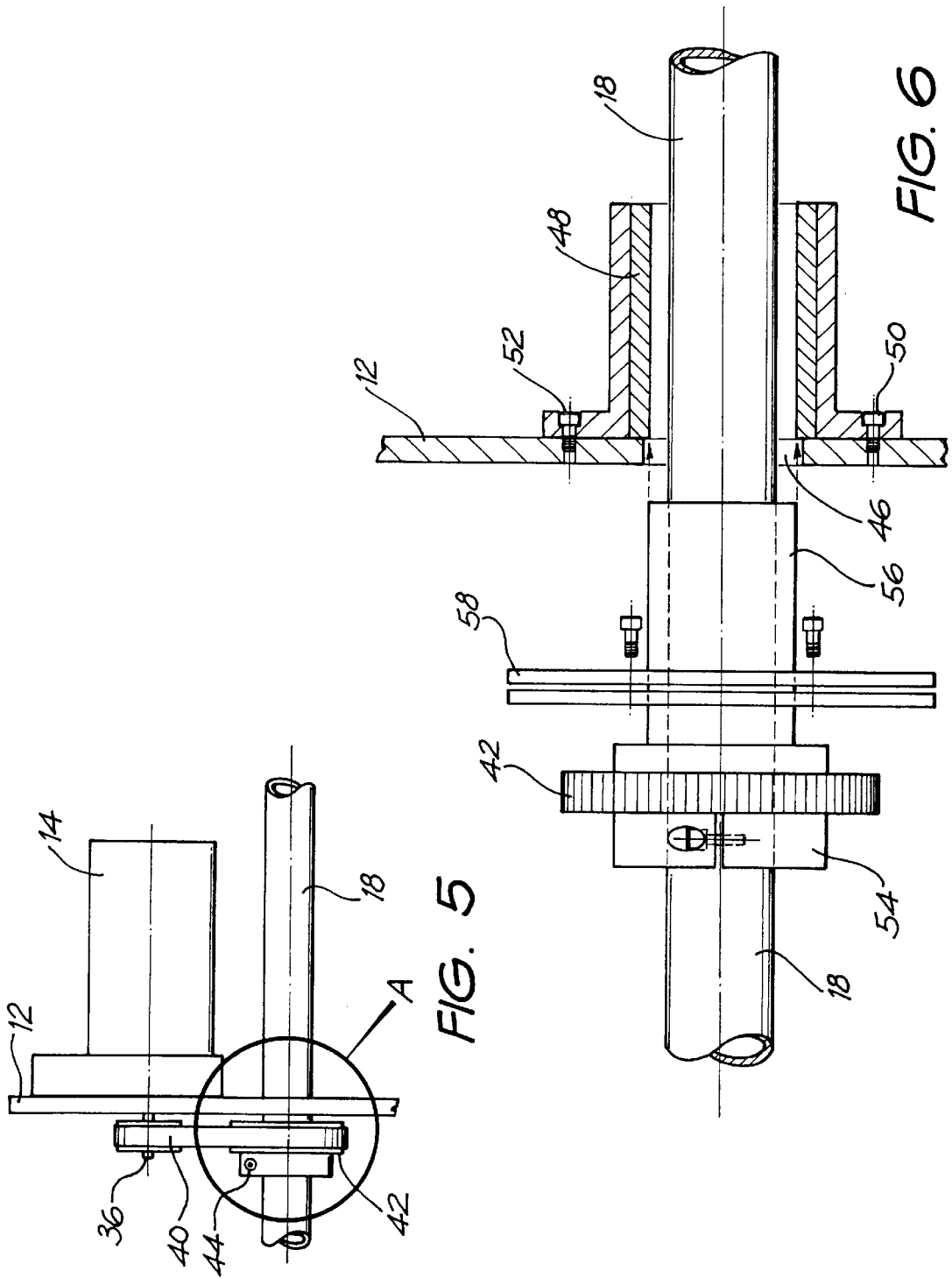

APPARATUS FOR WELDING

CROSS-REFERENCE TO RELATED APPLICATION

This application claims priority to Australian Application No. PQ9331, filed Aug. 10, 2000.

FIELD OF THE INVENTION

The present invention relates to an apparatus for achieving weld build up. More particularly, the present invention provides an apparatus for achieving weld build up on the surface of a bore.

DESCRIPTION OF THE PRIOR ART

Many pieces of apparatus include one or more bores. Such bores may receive shafts or pins to thereby connect other apparatus via the bore. For example, earthmoving excavators have various buckets or blades attached thereto via pins that pass through bores formed in eyelet extensions connected to the buckets or blades.

With use, bores can become worn and lose their required dimensional tolerance. In the example of buckets and blades used on earthmoving equipment, this causes clearance and subsequent loose fit; which is unacceptable. To restore worn bores, it is common to apply a layer of weld metal to the bore. This layer of weld metal is then machined to attain a smooth finish and the required dimensions within the bore.

In order to improve the quality of weld build up in bores, automated bore welding equipment has been developed Such bore welding equipment typically comprises a welding head mounted to the end of a rotatable shaft. The rotatable shaft is rotated by a drive means. An axial drive means moves the rotatable head along the axial extent of the bore. The axial drive means may operate continuously, in which case a helical bead of weld metal is deposited in the bore. Alternatively, the axial drive means may operate only when a full diameter of weld metal is deposited in the bore such that adjacent diameters of weld metal are deposited in the bore.

An example of a bore welding apparatus is described in U.S. Pat. Nos. 4 687 899 and U.S. Pat. No. 4 873 419, both in the name of Acheson. The bore welding apparatus described in these patents comprises a hollow, rotatable drive spindle that carries an electrical welding torch at one end thereof. The welding torch terminates in a nozzle. The drive spindle is arranged to feed electrical current, welding wire and protective gas to the welding torch.

In order to provide rotating rotating to the drive spindle whilst allowing the electrical current, welding wire and protective gas to be supplied to the welding torch, the apparatus is provided with a power coupling that has a first housing and a second housing. The first housing is connected to the drive spindle and rotates with the drive spindle. The second housing is fixed against rotation by a torque resistant means. A first washer is soldered to the first housing and a second washer is soldered to the second housing. A spring and thrust bearing arrangement forces the housings toward each other and keeps the first washer in contact with the second washer The second housing is also slipped over a stem of the first housing. Axial movement of the welding torch is achieved by a rack and pinion type arrangement in which a rack on a quill is driven by a pinion wheel that rotates under the action of a worm gear driven by a worm rod. The worm rod is rotated by a separate drive motor.

The welding apparatus is mounted to a cantilever-type mounting arrangement. This mounting arrangement can be attached to the work piece by a magnetic head or by mechanical clamping means. In practice, it has been found that it is difficult to accurately align and maintain the position of the bore welding apparatus using that mounting arrangement.

Another bore welding apparatus is described in Australian patent no 717802 in the name of Russo. The apparatus described in this patent can perform the boring of holes or the surfacing of welding in holes. The apparatus comprises an external hollow shaft (called the "cool carrying shaft"). When used as a bore welding machine, a welding torch is carried on the end of the shaft. The tool carrying shaft has a projecting key along its length and this key engages with a key way formed inside a tubular motor hub that is located at the forward end of a tubular box. The tubular motor hub has a ring gear mounted on its external surface and this ring gear engages with the gear mechanism of an electric motor to thereby cause rotation of the motor hub As the tool carrying shaft is keyed to the motor hub, the tool carrying shaft also rotates with the motor hub.

The bore welding machine also includes a further electric motor that drives a gear that engages with a rack formed on an external shaft. This external shaft is coupled by two internal shafts to the tool carrying shaft. The rack and gear mechanism is used to cause longitudinal movement of the external shaft, and hence longitudinal movement of the tool carrying shaft with respect to the bore being repaired.

When used as a welding machine, the machine is mounted to the work piece. An auxiliary shaft is required to be mounted to the work pieces which auxiliary shaft hooks to the tool carrying shaft to thereby center the tool carrying shaft. The mounting arrangement of the machine described in Australian patent number 717802 fixes the position of the motor hub with respect to the work piece. Consequently, the tool carrying shaft must have the key that engages with the key way in the motor hub to enable the tool carrying shaft to move longitudinally through the motor hub during axial movement of the tool carrying shaft.

BRIEF DESCRIPTION OF THE INVENTION

In a first aspect, the present invention provides an apparatus for achieving build up of a weld metal inside a bore comprising a torch tube carrying a welding torch, said welding torch being positioned intermediate the ends of the torch tube, said torch tube being adapted to be mounted to a work piece by mounting means, rotating drive means for rotating the torch tube and axial positioning means for moving the torch tube in an axial direction relative to the bore.

As used through out this specification, the term "rotating drive means" is used to refer to a drive means that causes rotation of the torch tubes.

In an embodiment of the present invention, the torch tube is connected to a coupler means, said coupler means having a fixed portion and a rotatable portion. The coupler means provides a suitable coupler for coupling a welding apparatus to the torch tube. The coupler means may have a welding apparatus connection on the fixed portion thereof for connecting to a welding apparatus, such as a conventional MIG welding apparatus. The coupler means and the torch tube provide a suitable assembly for conveying electrical current, welding wire and/or protective gas to the welding torch.

The apparatus of the present invention preferably further comprises fixing means for selectively fixing the relative axial position of the torch tube in the apparatus. The fixing means may be selectively operable between a fixed position in which the relative axial position of the torch tube is fixed and a disengaged position in which the relative axial position of the torch tube in the apparatus can be altered. The fixing means most preferably can be selectively connected to and disconnected from the torch tube. The fixing means suitably comprises clamping means for clamping onto the torch tube.

The apparatus may further comprise connecting means for operably connecting the rotating drive means to the torch tube.

The connecting means may connect the rotatable portion of the coupler means to rotating drive means. However, the connecting means used in the present invention most suitably connects the rotating drive means to the torch tube by a pulley and drive belt arrangement or by a geared arrangement.

The rotating drive means may suitably comprise a drive motor that causes rotation of a first gear or pulley, said rotation of the first gear or pulley causing rotation of a second gear or pulley to thereby cause rotation of the torch tube. Preferably, the second gear or pulley is mounted to or formed on the fixing means to thereby cause rotation of the fixing means when the fixing means is connected to the torch tube. More preferably, the fixing means comprises a hub, such as a split hub, and the second gear or pulley is mounted to or formed on the hub to thereby cause rotation of the hub when the hub is connected to the torch tube.

The axial positioning means used in the present invention preferably comprises an axial positioning member in use having one end in contact with the work piece being worked upon and longitudinal position moving means for causing relative longitudinal movement of the axial positioning member. The axial positioning members preferably comprises a screw means that passes through at least one nut mounted on or in the apparatus and the longitudinal position moving means comprises a drive motor for causing rotation of the screw means. The axial positioning means may alternatively have a free end in contact with another piece arranged in fixed relationship with the work piece.

Throughout this specification, the term "screw means" or "feed screw" includes a bar or similar elongate member having an external thread formed thereon. The screw means or feed screw does not need to be a tapered member, nor does it require a screw head to be included.

Rotation of the screw means causes the screw means to be moved longitudinally or axially by interaction of the rotating screw means with the at least one nut. As one end of the screw means is in contact with the work piece, axial movement of the screw means causes the apparatus to move axially with respect to the work piece. Alternatively, the longitudinal position moving means comprises a drive means for rotating the nut which will, in turn, cause the screw means to extend through the nut. In another embodiment, the axial positioning means comprises a shaft that can move longitudinally by interaction with a rack gear. In a further embodiment, the screw means may pass though a threaded member, such as a threaded hub, whereby relative rotation of the screw means and the threaded member causes relative longitudinal movement between the threaded member and the screw means.

A similar mode of action may be utilized in embodiments that employ a different axial positioning member and longitudinal position moving means. One example would be a shaft that is longitudinally moved by rollers.

In preferred embodiments of the present invention, the torch tube is mounted to the work piece by mounting means that contact the torch tube at two locations. This allows for the torch tube to be securely held in the desired position. The torch tube is preferably maintained to the work piece by mounting means that comprise align bore bearings located on opposite sides of the bore or opposite sides of the work piece. The torch tube can rotate in the mounting means and also move or Slide through the mounting means in an axial direction.

In all aspects of the present invention, the torch tube need not be a cylindrical tube. Indeed, the torch tube may have any external shape, the basic requirement for the torch tube being that it is elongate with a passage therein.

In an especially preferred embodiment of the present invention, the apparatus comprises a housing for housing the rotating drive means and the longitudinal position moving means. The housing may also comprise a passage through which the torch tube can extend.

In a second aspect, the present invention provides an apparatus for achieving build up of weld metal in a bore of a work piece, the apparatus comprising a torch tube carrying a welding torch, rotating drive means for rotating the torch tube, axial positioning means for controlling axial positioning of the torch tube relative to the bore and connecting means connecting the rotating drive means to the torch tube, said connecting means being selectively operable to connect to the torch tube wherein the relative axial position of the rotating drive means and the torch tube is fixed and to be disconnected wherein the relative longitudinal position of the rotating drive means and the torch tube can be altered.

In a third embodiment, the present invention provides au apparatus for achieving build up of weld metal in a bore of a work piece, the apparatus comprising a torch tube carrying a welding torch, rotating drive means for rotating the torch tube, and axial positioning means for controlling the axial position of the torch tube relative to the bore, wherein the axial positioning means comprises an axial positioning member having an end in contact with the work piece and axial position moving means for causing relative axial movement of the axial positioning member to thereby cause axial movement of the torch tube relative to the bore.

In this aspect, the axial position moving means causes relative movement between itself and the axial positioning member.

In a fourth embodiment, the present invention provides an apparatus for achieving build up of weld metal in a bore of a work piece, the apparatus comprising a torch tube carrying a welding torch, rotating drive means for rotating the torch tube, axial positioning means for controlling axial positioning of the torch tube relative to the bore and fixing means for fixing an axial position of the torch tube relative to the apparatus, said fixing means being selectively operable to connect to the torch tube, wherein the relative axial position of the torch tube is fixed and to be disconnected wherein the relative longitudinal position of the torch tube can be altered.

Preferred embodiments of the various features of the second and third aspects of the present invention are as described with reference to the preferred embodiment of the first aspect of the present invention.

A detailed description of preferred embodiments of the present invention will now be given with reference to the accompanying drawings. It will be appreciated that the drawings are intended to illustrate the present invention and that the invention should not be considered to be limited to the embodiments shown in the drawings.

BRIEF DESCRIPTION OF THE DRAWINGS

FIG. 5 shows part of the apparatus of FIG. 1

FIG. 6 shows an exploded view of the detail shown in FIG. 5;

DETAILED DESCRIPTION OF THE DRAWINGS

Figure 3:
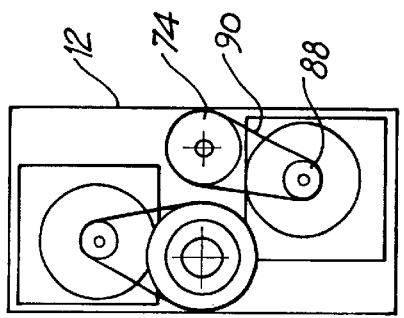
FIGS. 3 and 4 show end views of the apparatus of FIGS. 1 and 2, respectively.
Figure 4:
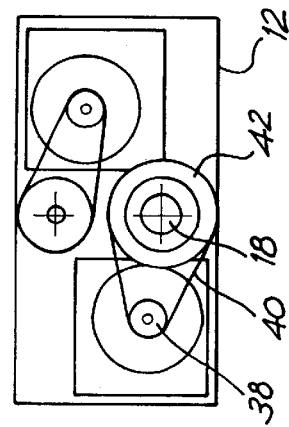

FIGS. 1 to 4 show an embodiment of an apparatus in accordance with the present invention. In these figures, the apparatus 10 includes a housing 12 Housing 12 houses a rotating drive motor 14 and an axial positioning drive motor 16. The apparatus further includes a torch tube 18 that carries a welding torch 20. As can best be seen from FIG. 1, welding torch 20 is pivotally connected to the torch tube 18 at pivot 22. This allows the radial positioning at the end of welding torch 20 to be varied, thereby enabling bores of differing dimensions to be welded. As can best be seen from FIG. 1, welding torch 20 is carried on the torch tube 18 at a position intermediate to the ends of the torch tube 18.

Figure 1:
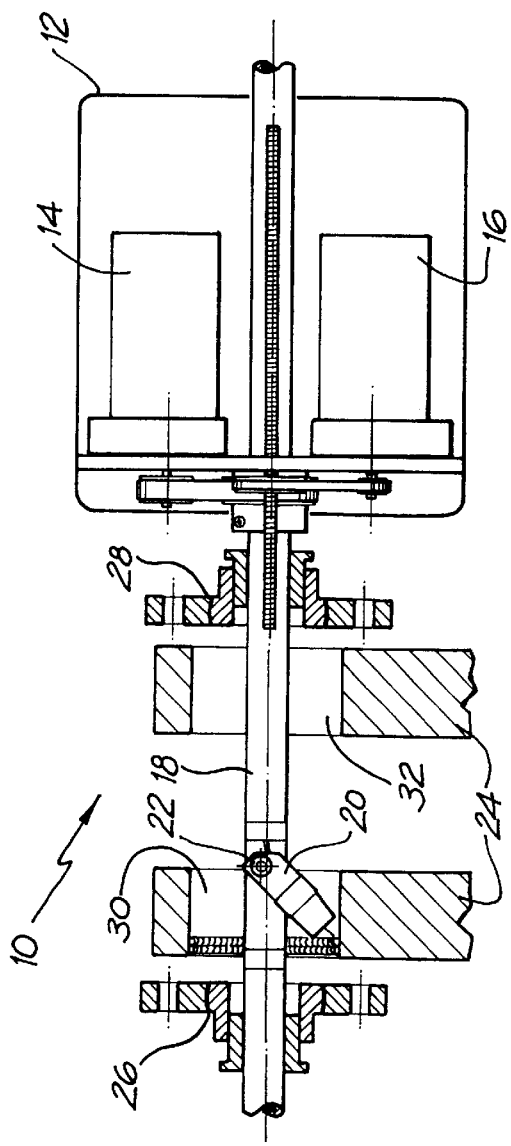
FIG. 1 shows a top view of an apparatus in accordance with the present invention.

As best shown in FIG. 1, torch tube 18 also extends through the housing 12. To facilitate this, the housing 12 is preferably provided with a passageway (not shown).

The torch tube 18 is mounted to a work piece 24 by mounting means that comprise first align bore bearing 26 and second align bore bearing 28. These are shown in FIG. 1. First and second align bore bearings are mounted to the work piece, for example, by bolts, by temporary welding or the like, such that the first and second align bore bearings 26, 28 are in alignment with the bores 30, 32 of the work piece 24.

The apparatus also includes an axial positioning member in the form of a feed screw 34 (FIGS. 7, 8, and 12) extending outwardly from the housing 12. Although not shown in FIGS. 1 to 4, it is preferred that the housing 12 includes a passageway for passage of the feed screw 34 there through.

As best shown in FIG. 5, rotating drive motor 14, which suitably comprises an electric motor, has a shaft 36 extending therefrom, which shaft 36 carries a pulley 38. A drive belt 40 connects pulley 38 to a second pulley 42. Second pulley 42 is formed on a fixing means 44 that can be selectively fixed to the torch tube 18. This is best shown in FIG. 5.

The detail highlighted as "A" in FIG. 5 is shown in exploded form in FIG. 6. As can be seen, the housing 12 includes an opening 46 therein. An insulated bearing 48 is mounted to the inside of housing 12 such that it extends rearwardly from opening 46. Suitable bolts or screws 50, 52 are used to mount the insulated bearing 48 to the housing 12. The connecting means 44 includes a clamping means in the form of a hub 54 having a hub shaft 56 extending rearwardly therefrom. Second pulley 42 is formed on the outer surface of split hub 54. Split hub 54 and hub shaft 56 define a passageway there through which is sized to be able to receive the torch tube 18. The split hub 54 and hub shaft 56 are received within insulated bearing 48 to thereby hold the fixing means 44 in position relative to the housing.

Split hub 54 also carries a micro switch disk 58. This disk can be used as part of the control system controlling operation of the welding apparatus to determine when a full revolution of the torch tube has taken place during operation. When the control system determines that a full revolution has taken place, it can then cause the apparatus to move axially the distance equivalent to one diameter of welding bead. This will be discussed in more detail hereunder.

Figure 7:
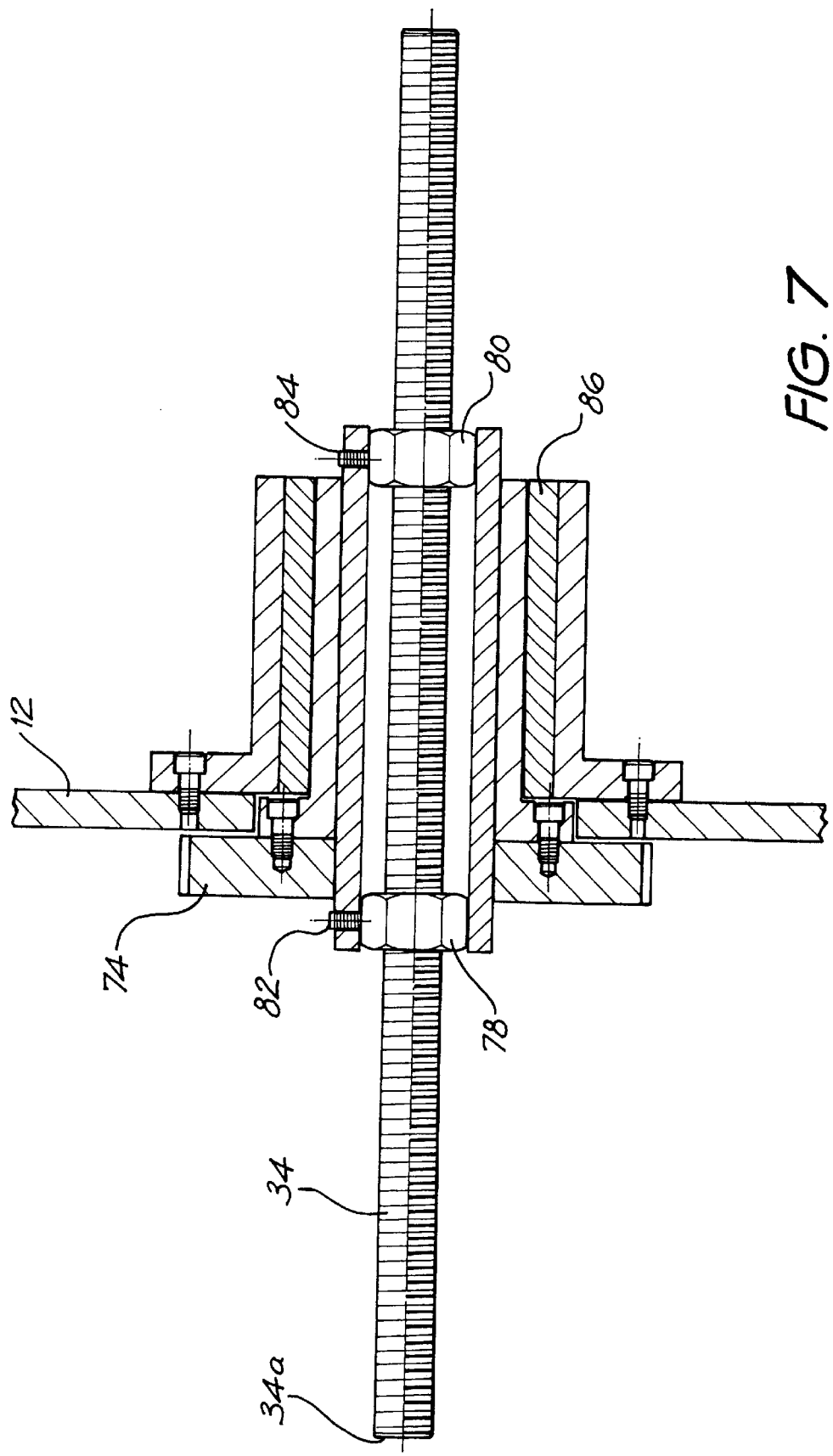
FIG. 7 shows an axial positioning mean.; in accordance with the present invention.
Figure 8:
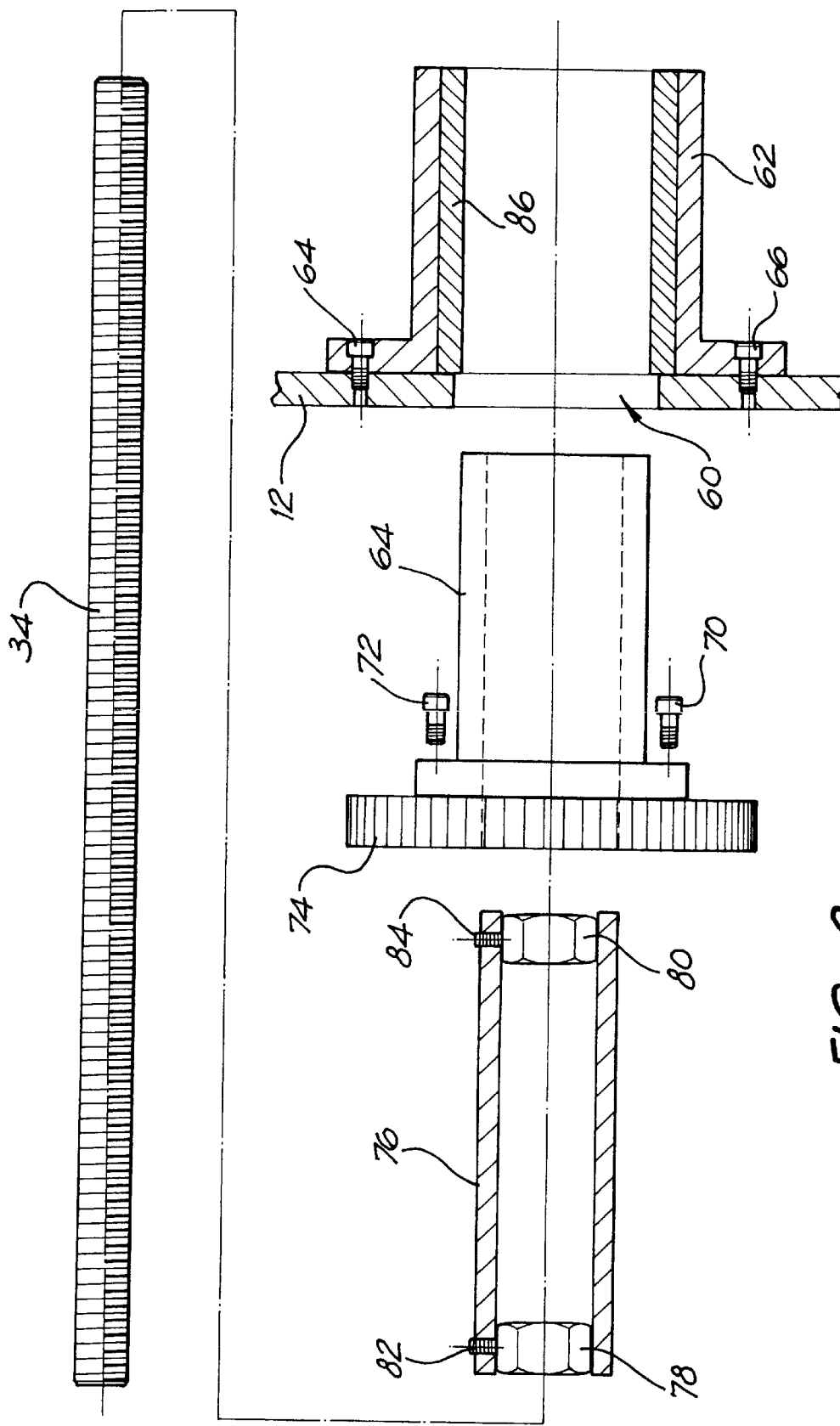
FIG. 8 Shows the component parts of FIG. 7.

FIGS. 7 and 8 show further detail of the arrangement of the feed screw 34 within the housing 12. In particular, housing 12 has an opening 60 therein. She opening 60 carries a flange housing 62 that is mounted to the housing 12 by bolts or screws 64, 66. A hub 68 is mounted to the housing 12 by screws or bolts 70, 72. Hub 68 is fitted with a pulley 74.

A hexagonal shaped sleeve or hex sleeve, 76 is mounted inside hub 68. As is best shown in FIG. 7, hex sleeve 76 is sufficiently long to extend from either end of hub 68. Hex sleeve 76 carries hexagonal nuts 78, 80 at either end thereof. Set screws 82, 84 are used to assist in holding hex nuts 78, 80 in place. A bearing 86 is positioned between the flange housing 62 and the hub 68. This enables the hub 68 to rotate within a flange housing 62. Description of the operation of the axial positioning means will be provided hereunder.

Figure 12:
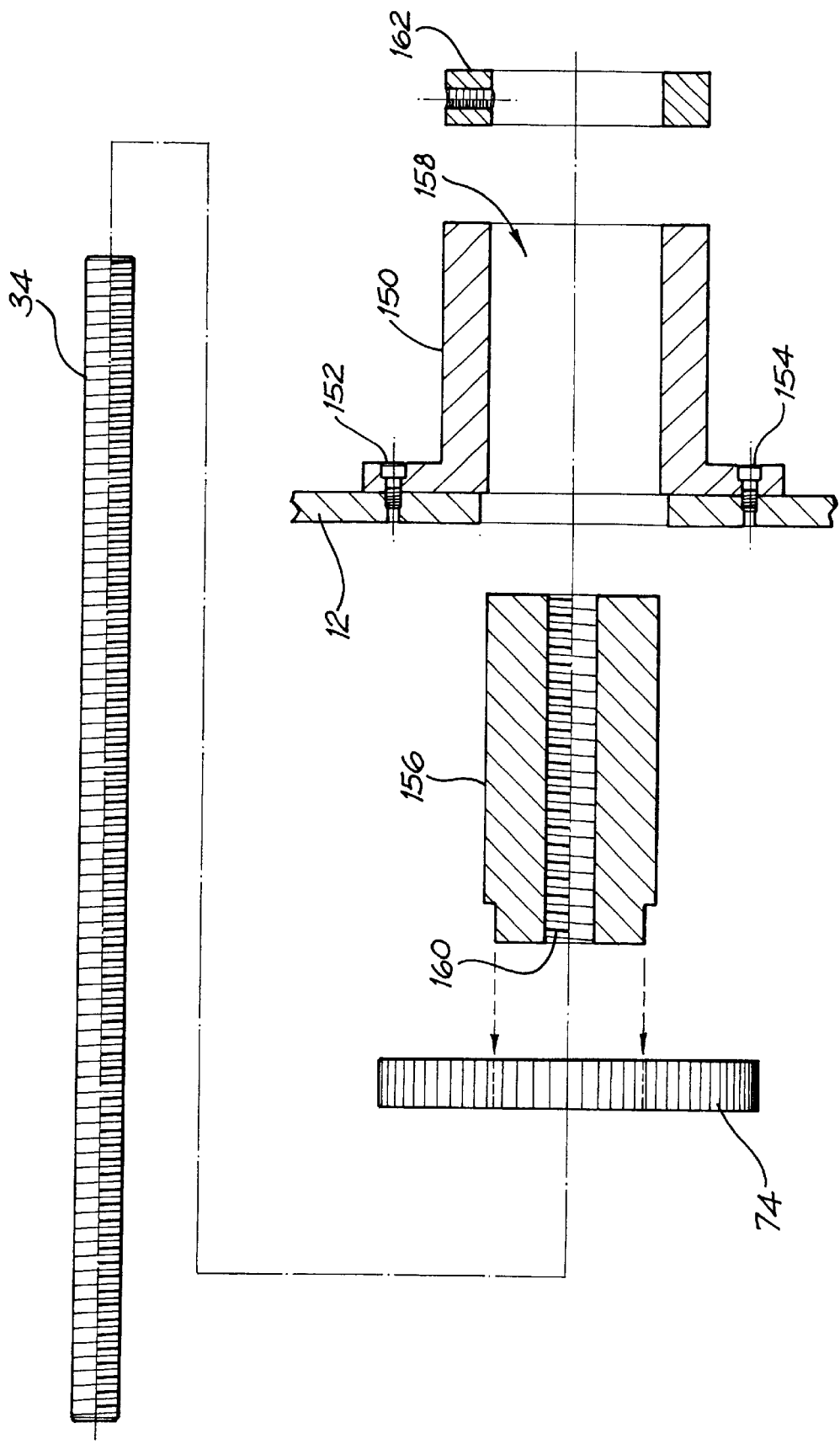
FIG. 12 shows a schematic diagram of an alternative embodiment to FIGS. 5 and 6.

An alternative arrangement for mounting of a feed screw 34 and for controlling movement of a feed screw 34 as shown in FIG. 12. This represents the currently preferred arrangement. In FIG. 12, a flange housing 150 is connected via screws 152, 154 to a wall of housing 12. A hub 156 is fitted into passageway 158 of flange housing 150. Hub 156 itself has a threaded passageway 160 for threadably receiving feed screw 34. Clamp collar 162 is used to retain a hub 156 in place is a flange housing 150. A timing pulley 74 is fitted to hub 150.

In use of the arrangement of FIG. 12, an integrated parallel gear motor is used to drive a feed screw 34. This parallel gear motor is equivalent in function to axial positioning motor 16 as shown in FIG. 1. It will be appreciated that a number of different mechanisms can be used to transmit power to the feed screw 34. Such mechanics may include a chain drive, belt drive, worm gear or the like. The present invention encompasses all such means for driving a feed screw 34.

In operation of the arrangement shown in FIG. 12, rotation of feed screw 34 causes the threaded hub 156 to relatively longitudinally move along fee; screw 34. As end 34a of feed screw 34 is in abutment with a work piece, the relative longitudinal movement of a feed screw 34 and the threaded hub 156 causes the position of the housing 12 relative to the work piece to be altered. In an alternative embodiment, the feed screw may be in abutment with the align bore bearing mounted to the work piece.

In order to use the apparatus shown in FIGS. 1 to 8, the torch tube is removed from the housing and mounted in first and second align bore bearings 26, 28. Align bore bearings 26, 28 securely mount the torch tube to the work piece 24 and ensure that the torch tube 18 is properly centered relative to the bores 30, 32 which are to be welded.

Once the torch tube 18 has been mounted to align bore bearings 26, 28, the housing 12 is positioned such that the passageway in housing 12 for the torch tube 18 receives the torch tube and the housing 12 is positioned a desired distance form the work piece 24. It will be appreciated that the drive unit incorporated in housing 12 can be placed at any location on the torch tube 18. This is of great practical benefit in use of the apparatus.

When the housing 12 has been positioned at the appropriate position, fixing means 44 is firmly connected to torch tube 18. In this regard, the fixings means 44 includes a split hub 54 with cross bolt crush. The simple expedient of tightening a bolt on the cross bolt crush closes the split hub such that it firmly clamps on the torch tube.

Figure 2:
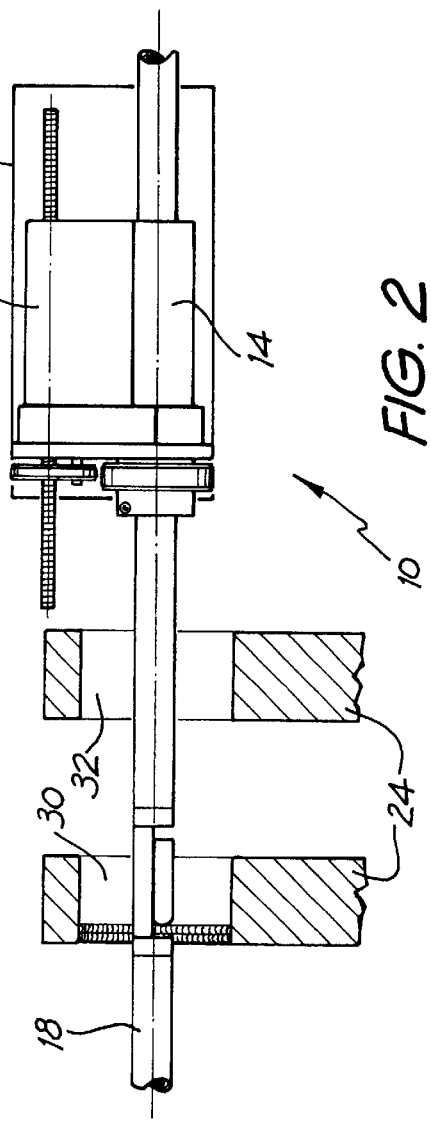
FIG. 2 shows a side view of the apparatus of FIG. 1.

Once the fixing means 44 has been securely connected to the torch tube 18, the housing 12 is clamped against axial movement relative to the torch tube 18. The feed screw 34 can then be adjusted such that an end 34*a* thereof is brought into contact with the work piece 34. Reference is made to FIG. 2 in this regard which shows the end 34*a* of feed screw 34 approaching the work piece 24.

The apparatus is essentially now ready for use Rotating drive motor 14 is energized, which causes first pulley 38 to rotate and thereby drive second pulley 42 into rotational movement. When second pulley 42 rotates, it also causes rotation of split hub 54. As split hub 54 is clamped to the torch tube 18, rotation of the torch tube 18 also takes place. Upon initiation of rotation of torch tube 18, the welding operation can commence. This results in welding torch 20 depositing a layer of weld metal onto the inside of bore 30.

The apparatus may be configured to deposit either a helical layer of weld material, in which case the axial positioning drive motor 16 is continuously operated at a desired rate to ensure an even, helical layer of weld metal is deposited. However, it is preferred that a number of discrete diameters of weld metal be deposited in the bore. This may be achieved by only actuating the axial positioning drive motor 16 upon receipt of a signal by the control system for the apparatus that a full diameter of weld metal has been deposited onto the bore. In this regard, micro switch disk 58 can be used to trigger a signal to the control system that a complete diameter of weld metal has been deposited. When the control system receives this signal, it actuates axial positioning drive motor 16, which causes pulley 88 to rotate. As pulley 88 rotates, drive belt 90 causes timing pulley 74 to also rotate. When timing pulley 74 rotates, hex sleeve 76 is caused to rotate. This causes hex nuts 78, 80 to also rotate. Both hex nuts 78, 80 and the feed screw 34 are threaded and thus rotation of the hex nuts 78, 80 causes feed screw 34 to move longitudinally relative to the housing 12. It is preferred that feed screw 34 is constrained against rotation in order to ensure that the feed screw 34 does not rotate with the hexagonal nuts 78, 80. The axial positioning drive motor 16 is operated such that feed screw 34 extends a distance that is equivalent to the thickness of 1 diameter of the weld metal deposited in the bore. In this fashion, a plurality of separate diameters of weld metal can be deposited in the bore. The axial feed "distance" or "feed rate" is adjustable or variable, by motor run time, motor run speed, or both. This feature allows the operator to control the proximity of one bead to the adjacent bead.

From the above description, it will be appreciated that extending the feed screw 34 from the housing forces the housing away from the work piece 24 because the end 34*a* of the feed screw is in contact with the work piece 24. As the torch tube 18 is clamped against axial movement relative to the housing by the fixing means 44, the torch tube 18 also moves axially with respect to the work piece 24.

The torch tube 18 is preferably a segmented torch tube made up from a plurality of segment parts. This is advantageous in that it enables the length of the torch tube to be varied to suit work pieces of various lengths.

Figure 9:
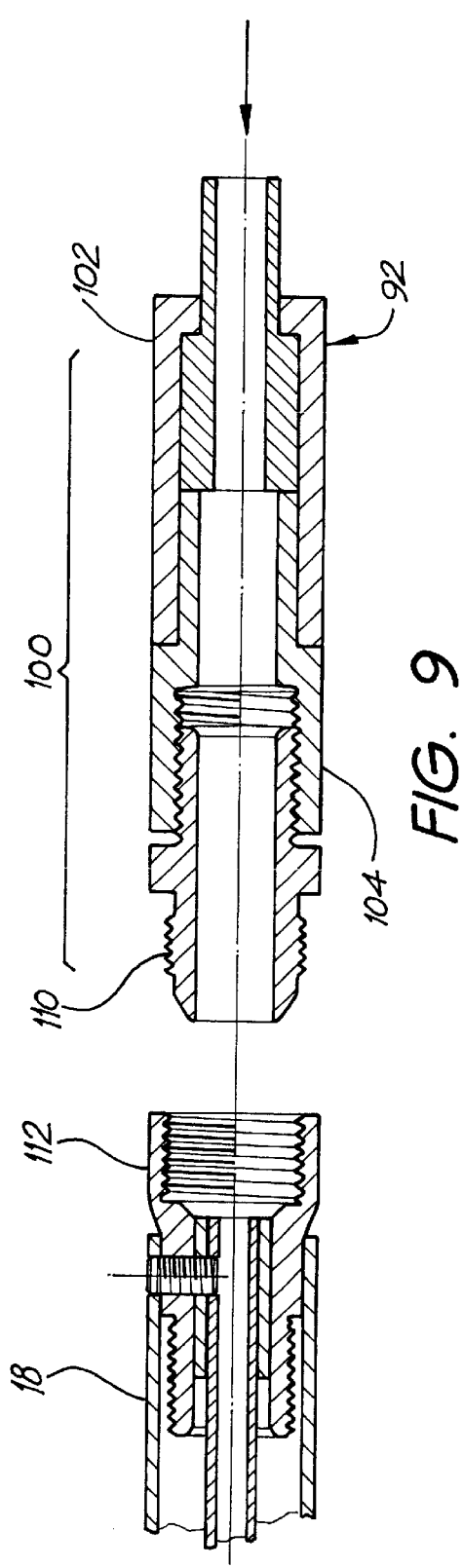
FIG. 9 shows a coupler assembly that can be used to connect the torch tube to a welding machine.
Figure 10:
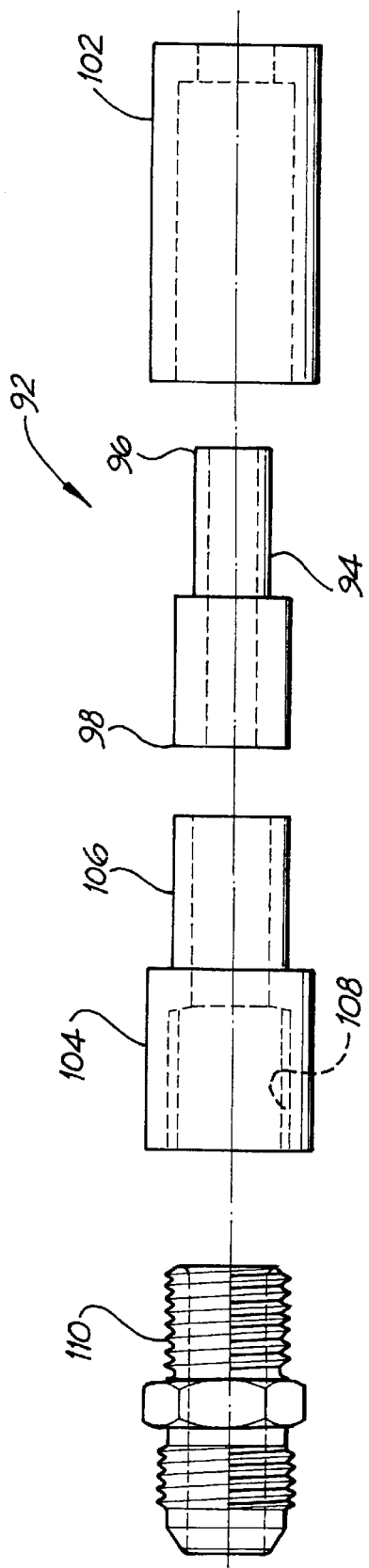
FIG. 10 shows the coupler assembly of FIG. 9 apart and in line for assembly.

The torch tube is preferably connected to a welding machine, such as a standard MIG welding apparatus. It is preferred that the torch tube provides a means for delivering electrical current, welding wire and/or a protective gas to the welding torch 20. In order to enable connection of the torch tube to the welding machine to be a relatively simple and quick operation, it is preferred that the end of the torch tube 18 is connected to a coupler assembly 92. A suitable coupler assembly is shown in FIGS. 9 and 10. The coupler assembly 92 includes a fixed conductor 94 having a first end 96 and a second end 98 of relatively larger diameter. First end 96 of fixed conductor 94 is adapted to be attached to a welding gun, welding machine or the like.

The coupler assembly 92 further includes a rotatable assembly 100. Rotatable assembly 100 includes a conductor sleeve 102, and a conductor adaptor 104. As best shown in FIG. 9, conductor sleeve 102 fits over fixed conductor 94. Conductor adaptor 104 includes a portion 106 of reduced diameter that also fits within conductor sleeve 102. Conductor adaptor 104 also includes a threaded portion 108 hat receives a male member 110. Male member 110 in turn can be threadably connected to a suitable connection 112 located on the end of torch tube 18. This is best shown in FIG. 9.

In operation of the apparatus, when torch tube 18 is rotated, the rotating assembly 100 can rotate around the fixed conductor 94. This enables electric current to be passed from the fixed conductor 94 to the rotating assembly 100 and thereafter into the torch tube 18. Similarly, the coupler assembly 92 shown in FIGS. 9 and 10 also provides appropriate passageways for protective gas and welding wire.

Figure 11:
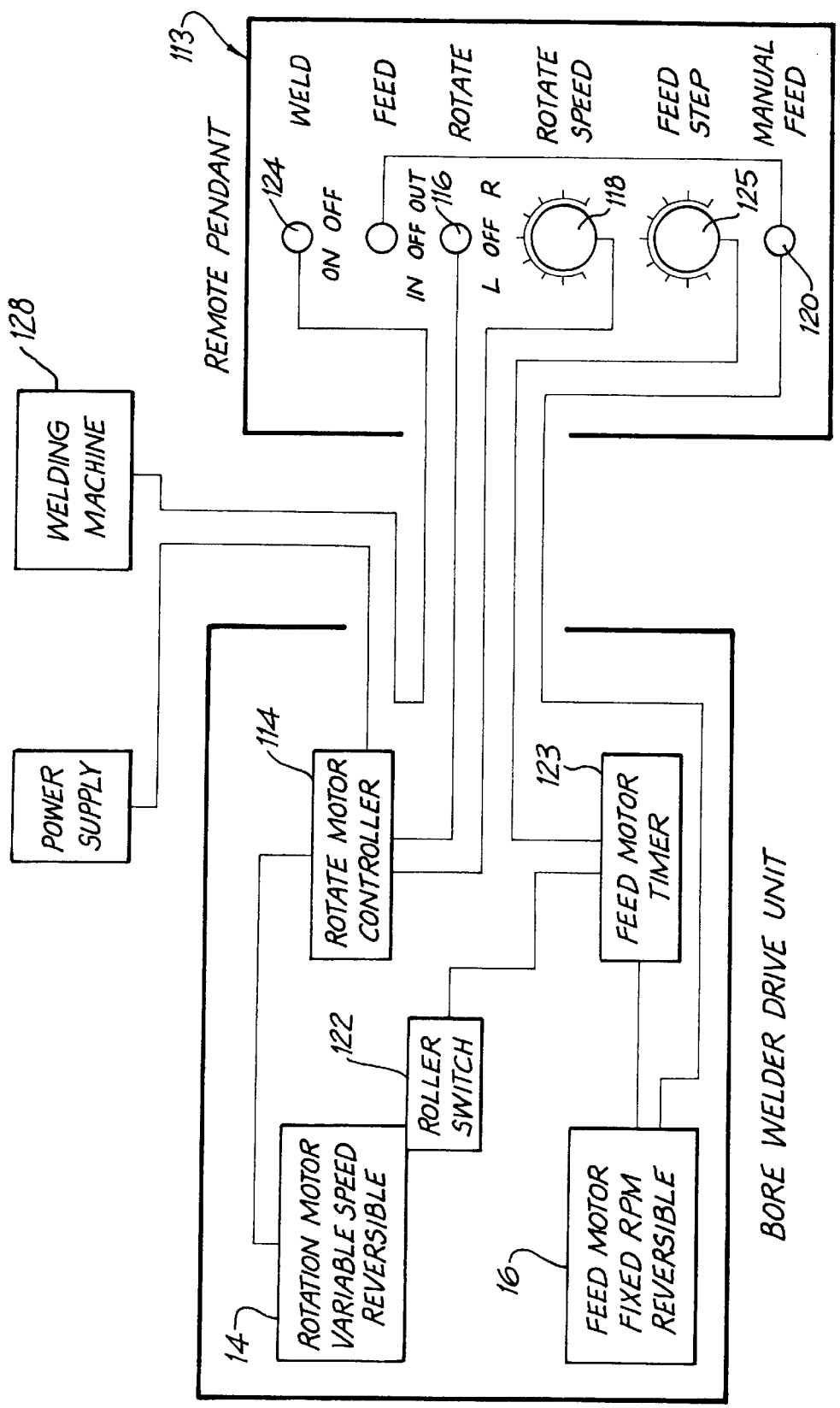
FIG. 11 shows a schematic diagram of a control system for an embodiment of the present invention.

FIG. 11 shows a schematic diagram of a control system that may be used with the apparatus of the present invention. In particular, the control system includes a remote pendant 113 having controls for turning the welding machine on or off, for controlling the feed screw 34, for controlling the rotation of the torch tube 18 and for controlling the rotational speed of the torch tube 18. The rotating drive motor 14 is controlled by a motor controller 114 that is operatively connected to the rotation on/off switch 116 and the rotation speed dial 118. The axial positioning drive motor 16 is capable of manual and automatic operation. In manual operation mode, switch 120 can be used to turn the motor on and off to thereby move the feed screw 34 in and out with respect to the housing as desired. In automatic operation, a roller switch 122 determines the appropriate times to activate the axial positioning drive motor 16 in order to properly control the axial positioning of the apparatus. Feed motor timer 123 forms part of the feed screw control system. A feed step dial 125 can be used to adjust the length of each "step" that the feed screw is advanced.

The weld on/off switch 124 in remote pendant 113 is connected to the welding machine 128.

Figure 13:
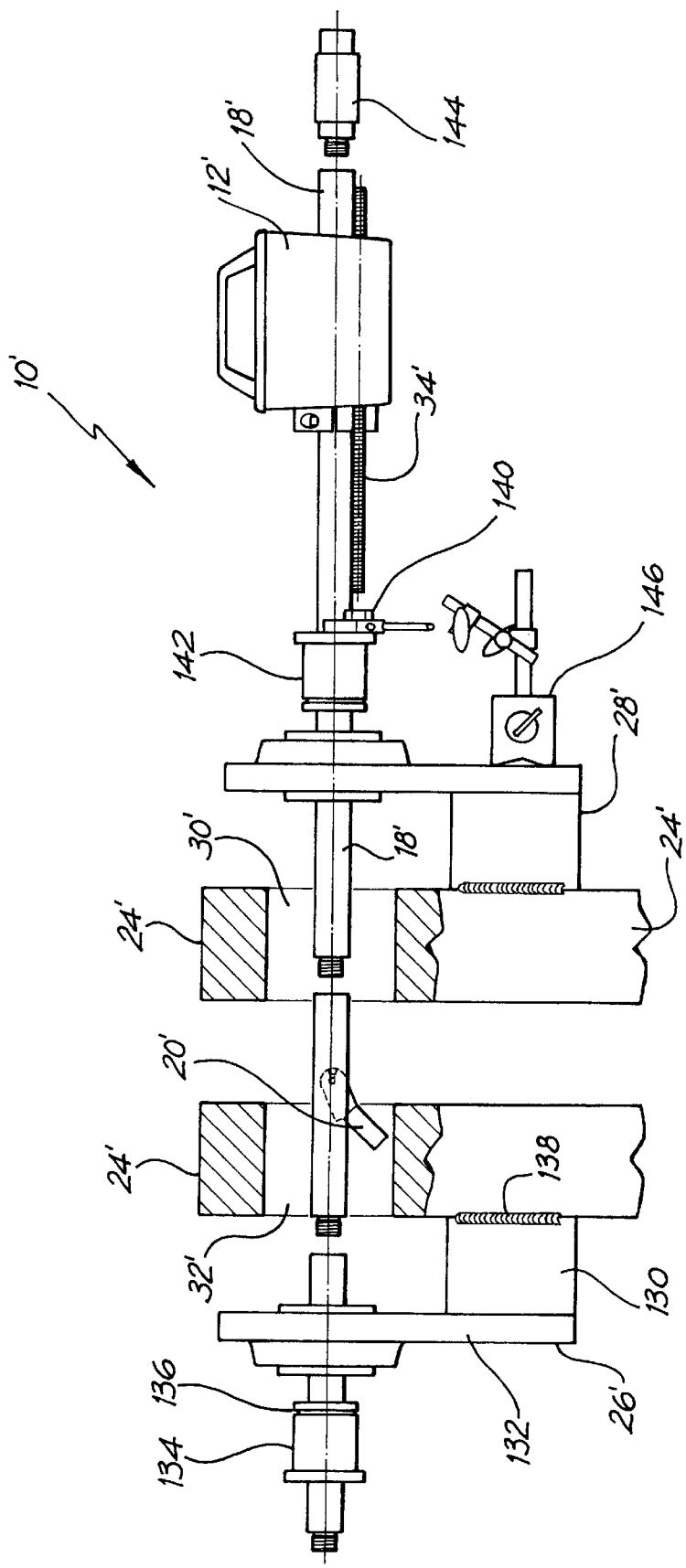
FIG. 13 shows a side view of another embodiment of the present invention.

FIG. 13 shows a similar view to that of FIG. 2, but showing more detail of the mounting arrangement, for consistency of description, the features of FIG. 12 that correspond to those of FIG. 2 are denoted by the same reference numeral with a prime (') added.

As shown in FIG. 13, a work piece 24' having a bore 30', 32' therein has a first align bore bearing 26' and a second align bore bearing 28'. First align bore bearing 26' comprises a leg 130 and a bearing arm 132. Bearing arm 132 has a aperture of larger diameter than the outer diameter of torch tube 18'. In order to securely mount the torch tube 18' to align bore bearing 26', an electrically non-conductive bushing 134 is provided, which bushing fits into and is retained in the aperture in bearing arm 132. It will be appreciated that the aperture in bearing arm 132 may contain a bearing surface or a bearing apparatus (e.g. roller bearing) to enable rotation of bushing 134 therein. Bushing 134 may be held in place in the aperture by a spring clip 136. Bushing 134 is suitably made from a polytetrafluoroethylene product, such as Teflon®.

The torch tube 18' is held in place in align bore bearing 28' in identical fashion.

In order to fix align bore bearing 26' to work piece 24', leg 130 is welded, for example, by line of weld material 138, to work piece 24'. it will be appreciated that other methods of fixing align bore bearing to work piece 24', such as bolting or clamping, may also be used.

Once the align bore bearings 26',28' have been positioned and torch tube 18' mounted therein, housing 12' is clamped to torch tube 18' in a manner as described hereinabove. Feed screw 34' is adjusted so that its free end comes into contact with a feed screw bracket 140 that is formed on or mounted to bushing 142. It will be understood that the free end of feed screw may alternatively contact the work piece 24', whether that any other member is mounted to the work piece 24' or not. Rotatable power coupling 144 is attached to the apparatus 10 and the apparatus is ready to commence the welding operation.

The apparatus shown in FIG. 12 may also utilize a magnetic base feed clamp 146.

The apparatus described herein provides a number of significant advantages over the prior art known to the inventors. In particular, the apparatus is able to use pre-existing align bore bearings to support the torch tube aid drive system in the event that the operator owns a line boring system. Those skilled in the art of repairing worn bores with align boring equipment will appreciate that initial placement of the align bore bearings is a step for post-weld machining. Moreover, it is the torch tube that is mounted (via the align bore bearings) to the work piece, once it has been slid through the bearings. The actual drive unit of the apparatus is not itself directly mounted to the work piece. This enables relatively quick alignment of the torch lube to be achieved. Once the torch tube has been mounted to the work piece, the drive unit and its associated housing is positioned over the torch tube and the drive unit is clamped to the torch tube. This clamps the torch tube against axial movement relative to the drive unit. It also enables rotational movement of the torch tube to be achieved. The drive unit can be placed It any location relative to the torch tube. Indeed, for very large work pieces having a plurality of bores to be lined, it may be possible to place the drive unit between respective bores Control of axial movement of the torch tube is also accurately obtained by using a very simple mechanism.

Those skilled in the art will appreciate that the invention described herein may be susceptible to a number of variations and modifications not specifically shown. In particular, it will be appreciated that the axial positioning means may be operated such that feed screw 34 is rotated while hexagonal nuts 78, 80 or hub 156 are restrained against rotation. In this regard, some modification to the arrangement of the hub 68 or 156 and timing pulley 74 will be required. However, such modifications would be well within the knowledge of those skilled in the art.

It will also be appreciated that a number of different mechanisms may be used to clamp the torch tube 18 in position relative to the rotating drive motor 14. Furthermore, the arrangements of pulleys and drive belts described with reference to the attached figures may be replaced by any mechanically equivalent devices.

The invention described herein may be subject to other variations and other, modifications other than those specifically described. It is to be understood that the invention extends to encompass all such variations and modifications that fall within its spirit and scope.

What is claimed is:

1. An apparatus for achieving build up of weld metal in a bore of a work piece, the apparatus comprising a torch tube carrying a welding torch, mounting means for mounting the torch tube to the work piece, said mounting means comprises align bore bearings mounted to a work piece, rotating drive means for rotating the torch tube, and axial positioning means for controlling the axial position of the torch tube relative to the bore, wherein the axial positioning means comprises an axial positioning member having an end in contact with the work piece, the mounting means or a further member in a fixed position relative to the work piece, and axial position moving means for causing relative axial movement of the axial positioning member to thereby cause axial movement of the torch tube relative to the bore.

2. Apparatus as claimed in claim 1 wherein said axial positioning member comprises a screw means passing through at least one threaded opening in or on the apparatus and said axial position moving means comprises a drive motor for causing relative rotation between the screw means and the threaded opening such that said screw means is relatively longitudinally moved through said threaded opening.

3. Apparatus as claimed in claim 1 wherein said axial positioning member comprises a shaft.

4. Apparatus as claimed in claim 1 further comprising a housing, said torch tube and said axial positioning member extending from said housing.

5. Apparatus as claimed in claim 1 further comprising fixing means for fixing an axial position of said torch tube relative to the housing, said fixing means being selectively connectable to and disconnectable from said torch tube.

6. Apparatus as claimed in claim 5 wherein said fixing means comprises clamping means for clamping onto said torch tube.

7. Apparatus as claimed in claim 5 wherein said fixing means comprises a split hub having a passageway therethrough, said torch tube passing through said passageway in said split hub, and fastening means for selectively fastening said split hub to said torch tube.

8. Apparatus as claimed in claim 1 further comprising a coupler means for coupling a welder apparatus to said torch tube, said coupler means comprising a fixed portion and a rotatable portion, said fixed portion of said coupling means having a welding apparatus connection thereon for connecting the welding apparatus to said fixed portion.

9. Apparatus as claimed in claim 1 wherein said rotating drive means comprising a drive motor for rotating a first gear or pulley, and a second gear or pulley operatively associated with said first gear or pulley such that rotation of the first gear or pulley causes rotation of said second gear or pulley, said second gear or pulley being connected to said torch tube to thereby cause rotation of said torch tube.

10. Apparatus as claimed in claim 1 further comprising a control system for determining when a full rotation of said torch tube has occurred, said control system activating said axial positioning means when said control system determines when a full rotation of said torch tube has occurred to relatively advance said axial positioning member by a distance corresponding to a thickness of one diameter of weld deposited in the bore.

11. An apparatus for achieving a building up of weld metal in a bore of a work piece, the apparatus comprising a housing, a torch tube extending from said housing, said torch tube carrying a welding torch, mounting means for mounting the torch tube to the work piece, rotating drive means positioned within the housing for rotating the torch tube, axial positioning means for controlling the axial position of the torch tube relative to the bore, said axial positioning means comprising an axial positioning member extending from the housing, said axial positioning member having an end in contact with the work piece, the mounting means or a further member in a fixed position relative to the work piece, said axial positioning means further comprising axial position moving means for causing axial movement of the axial positioning member relative to the housing to thereby cause axial movement of the torch relative to the bore, and fixing means for fixing an axial position of said torch tube relative to said housing, said fixing means being selectively connectable to and disconnectable from said torch tube.

12. Apparatus as claimed in claim 11 wherein said rotating drive means comprises a drive motor for rotating a first gear or pulley, and a second gear or pulley operatively associated with said first gear or pulley such that rotation of said first gear or pulley causes rotation of said second gear or pulley, said second gear or pulley being formed with or connected to said fixing means such that rotation of said second gear or pulley rotates said torch tube when said fixing means is connected to said torch tube.

13. Apparatus as claim in claim 11 wherein said mounting means comprises align bore bearings in which said torch tube can rotate and move axially therethrough.

14. Apparatus as claimed in claim 11 wherein said axial positioning means is selected from the group consisting of:
(a) an axial positioning member comprising a screw means passing through at least one nut mounted in or on the housing and said axial position moving means comprising a drive motor for causing rotation of said screw means;
(b) an axial positioning member comprising a screw means passing through at least one nut mounted in or on the housing and said axial position moving means comprising a drive motor for causing rotation of said nut;
(c) an axial positioning member comprising a shaft that moves axially;
(d) an axial positioning means comprising a screw means passing through a threaded hub and said axial position moving means comprising a drive motor for causing relative rotation between said screw means and said threaded hub; and
(e) a shaft that is axially moved by rollers.

* * * * *